United States Patent [19]

Reno

[11] Patent Number: 5,157,555
[45] Date of Patent: Oct. 20, 1992

[54] APPARATUS FOR ADJUSTABLE CORRECTION OF SPHERICAL ABERRATION

[75] Inventor: Charles W. Reno, Cherry Hill, N.J.

[73] Assignee: General Electric Company, Philadelphia, Pa.

[21] Appl. No.: 802,231

[22] Filed: Dec. 4, 1991

[51] Int. Cl.$^5$ ............................................. G02B 7/02
[52] U.S. Cl. ............................. 359/823; 359/565; 250/309; 369/44.25; 369/44.11
[58] Field of Search ............ 359/823, 825, 557, 554, 359/565, 722, 723, 733, 793, 794, 795; 250/309, 310; 369/43, 44.11, 44.25

[56] References Cited

U.S. PATENT DOCUMENTS

| | | | |
|---|---|---|---|
| 3,404,403 | 10/1968 | Vallese et al. | 359/823 |
| 3,614,456 | 10/1971 | Hamisch | 359/823 |
| 3,678,281 | 7/1972 | Gleixner | 359/557 |
| 4,376,303 | 3/1983 | Lurie | 359/823 |
| 5,020,044 | 5/1991 | Shimonou | 369/44.25 |
| 5,031,165 | 7/1991 | Fujita | 369/44.11 |

Primary Examiner—Loha Ben
Attorney, Agent, or Firm—Geoffrey H. Krauss

[57] ABSTRACT

Apparatus for correcting spherical aberration of light reflected from a surface of an information-bearing layer of an optical disk and traversing through a substantially transparent substrate layer, overcoating the information layer, prior to traversal of a multi-element objective lens means, uses a correction lens assembly having several lens elements, with a variable air gap between the adjacent surfaces of a sequential pair of the lens elements. Information about the nominal thickness of an optical disk from which optical energy is then being reflected is obtained, and used to adjust the thickness of the air gap, to correct the additional spherical aberration caused by the change in covering substrate thickness and change the definition of the corrected spot to approach the definition of a spot obtained with a covering substrate of exactly the nominal value.

11 Claims, 1 Drawing Sheet

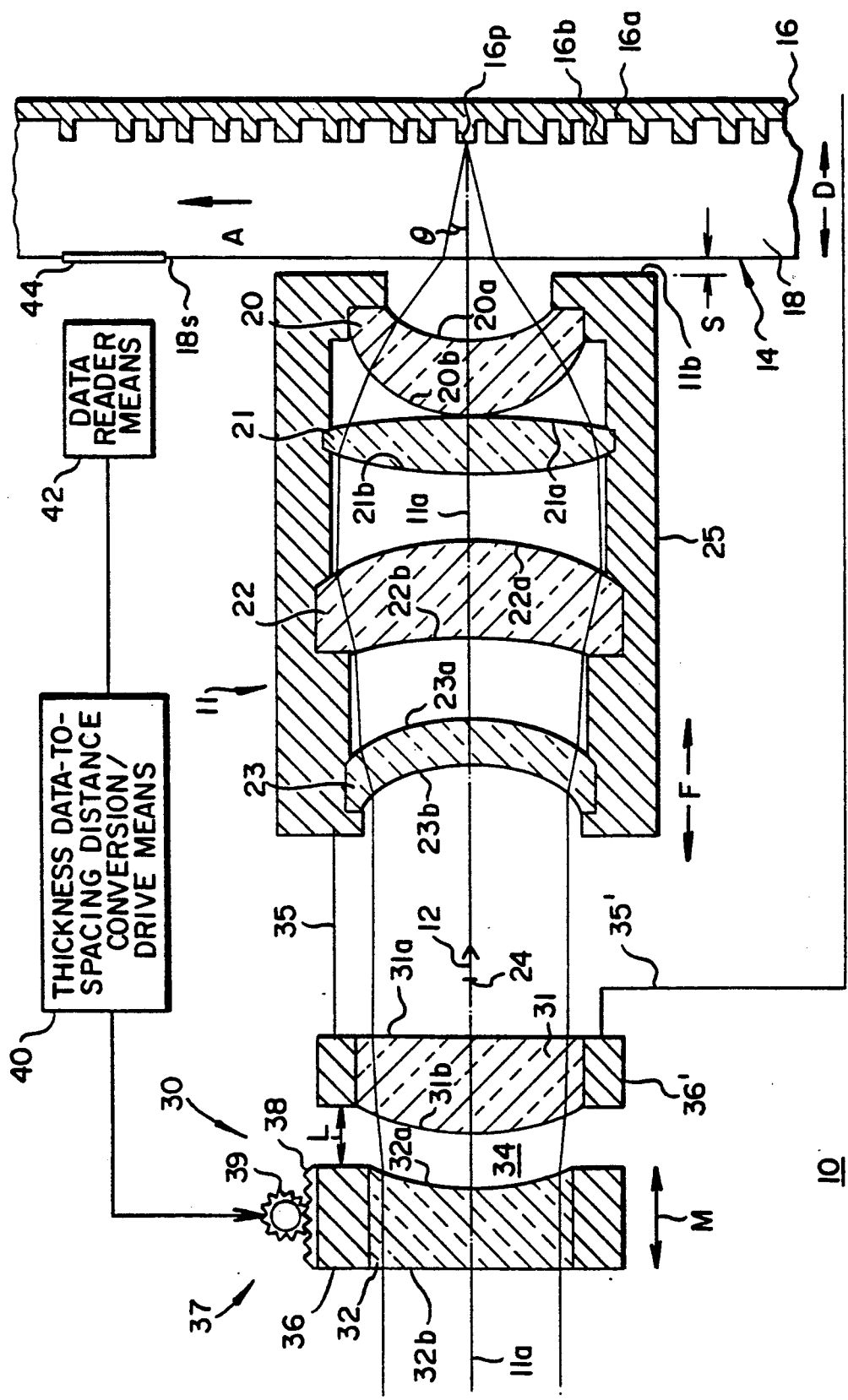

APPARATUS FOR ADJUSTABLE CORRECTION OF SPHERICAL ABERRATION

The present invention relates to optical disk recorders and, more particularly, to novel apparatus for the adjustable correction of spherical aberration due to differences in the thickness of the overcoating substrate of an optical disk used in such recorders.

BACKGROUND OF THE INVENTION

It is now well known that an optical disk recorder can provide certain advantages in the data storage arts. Hitherto, the optical disk media utilized for data storage required a relatively tight tolerance of the thickness of the substrate utilized to overcoat the data storage layer. However, any variation in the optical disk overcoat layer thickness causes changes in spherical aberration, away from the design value of the objective lens utilized in the recorder (presently designed to provide acceptably low spherical aberation with a disk having an overcoat substrate of thickness within ±20 micrometers of the nominal value); any larger deviation from nominal thickness may result in significant loss of both modulation transfer function (MTF) and spot definition, resulting in unacceptable amplitude loss, so that recovery of data in the reading mode may be rendered impossible. Manufacturers of the optical disk media would like to see even greater tolerances be allowable for the optical disk overcoating layer thickness, as increased tolerance acceptability will have a major negative cost impact. However, even greater substrate thickness tolerances will even more significantly increase spherical aberration. While there is no presently known means for correcting the spherical aberration utilizing the focusing objective lens means of the present optical disk recorders, it is highly desirable to provide some means for correcting spherical aberration, and especially adapted for correction of differing degrees of spherical aberration engendered by the wider range of thicknesses of the optical disk overcoating substrate.

BRIEF SUMMARY OF THE INVENTION

In accordance with the invention, apparatus for correcting spherical aberration of light reflected from a surface of an information-bearing layer of an optical disk and traversing through a substantially transparent substrate layer, overcoating the information layer, prior to traversal of a multi-element objective lens means, comprises: correction means having a plurality of lens elements, with a variable air gap between the adjacent surfaces of a sequential pair of the lens elements; means for obtaining information about the nominal thickness of an optical disk from which optical energy is then being reflected; and means for adjusting the thickness of the air gap responsive to the nominal thickness information, to correct the additional spherical aberration caused by the change in covering substrate thickness and change the definition of the corrected spot to approach the definition of a spot obtained with a covering substrate of exactly the nominal value.

In a presently preferred embodiment, the corrector means is a pair of lens, with the first lens being nearer to the objective lens and having a convex exiting surface, and the second lens being further from the disk and having a concave surface adjacent to the first lens. The air gap between the first and second lenses is respectively increased or decreased for a disk of respective decreased or increased overcoating substrate thickness.

Those skilled in the art will appreciate the manner in which this apparatus provides novel adjustable correction of spherical aberration, upon reading the following detailed description of a presently preferred embodiment of the invention, when considered in conjunction with the associated drawing.

BRIEF DESCRIPTION OF THE DRAWING

The sole FIGURE is a sectional side view taken through a portion of an optical disk, an associated objective lens means, and a corrector lens means in accordance with the principles of the present invention.

DETAILED DESCRIPTION OF A PRESENTLY PREFERRED EMBODIMENT

Referring to the sole FIGURE, a portion 10 of an optical disk recorder includes an objective lens means 11 which acts, among other functions, to focus an incident optical radiation beam 12 into an optical disk 14. The optical disk contains a layer 16 of a (metallic) material, which is formed or otherwise altered, either permanently or temporarily, to various depths 16a/16b for encoding (digital) information therein, and is overcoated with a substrate layer 18 of a substantially transparent material, allowing the focussed incident beam 12 to impinge upon the surface of a particular information-bearing layer formation 16p then lying along the optical axis 11a of the objective lens means. The particular layer formation 16p continually changes as disk 14 rotates (say, in the direction of arrow A, about an axis of rotation (not shown). The incident energy of a reading beam can be contained in a cone of half-angle $\theta$, where angle $\theta$ is related to the numerical aperture (NA) of the objective lens system; sufficient energy for reading the disk will be reflected into the same numerical aperture. Illustratively, for a lens system 11 of NA =0.65, with a substrate of refraction index n =1.5, cone half-angles up to about 25.7° are possible. The objective lens means 11 is typically a multi-lens system, illustratively having four lenses 20-23 arranged in a housing 25 with a forward end 11b having a spacing distance S which is variable with respect to the facing exterior surface 18s of the rotating optical disk, as housing 25 is moved in the direction of arrows F, by focussing means (not shown, but well known in the art), to maintain focus even as the depth D of the overcoating substrate layer is changed. Typically, the overcoating layer thickness D is relatively stable (say, within ±10 micrometers) in any particular optical disk 14, although the mean depth D (say, 1.213 millimeters) may vary over a predetermined total range (say, a range of 0.080 mm., from a minimum spacing of about 1.173 millimeters to a maximum spacing of about 1.253 mm.). Thus, at some position 24 along the optical axis and upon the other side of objective lens means 11 from the optical disk, the disk-reflected optical radiation may be collimated, but be subjected to spherical aberration, of an amount dependent upon the thickness D of the overcoating substrate layer of the particular disk 14 then being played, as well as the spacing necessary to achieve focus for that disk. For example, the position 24 may be at a distance of about 5.84 mm. behind the last objective lens surface 23b, for the situation where the overcoating layer is formed of 1.213 mm. thick Schott BK7 glass (refractive index of about 1.522 at 488 nm.), and the four objective lens 20-23 are formed of Schott LAFN2 glass (refractive index of 1.755 at 488 nm.), with (in one possible objective design) the first lens surface 20a, nearest to the disk, having a radius-of-curvature of about 3.70 mm. and a spacing of about 0.53 mm. between surfaces 18s and 20a, along axis 11a; the on-axis thickness of lens 20 (i.e., the thickness between surfaces 20a and 20b, along axis 11a) may be about 1.81 mm., with surface 20b having a curvature radius of 3.22 mm. The second lens 21 can have a first surface 21a with a curvature radius of about −32.81 mm. (the negative radius indicating that the center of curvature lies along axis 11a to the left of the lens surface) and with an on-axis separate from lens surface 20b of about 0.10 mm.; the second lens second surface 21b has a curvature radius of about 10.07 mm. and the on-axis thickness of the second lens (between surfaces 21a and 21b) is about 1.33 mm. The third lens 22 can have a first surface 22a with a curvature radius of about −8.71 mm. and with an on-axis separate from lens surface 21b of about 1.62 mm.; the third lens second surface 22b has a curvature radius of about −26.16 mm. and the on-axis thickness of the third lens (between surfaces 22a and 22b) is about 2.42 mm. The fourth lens 23 can have a first surface 23a with a curvature radius of about −5.79 mm. and with an on-axis separate from lens surface 21b of about 1.90 mm.; the fourth lens second surface 23b has a curvature radius of about −3.82 mm. and an on-axis thickness (between surfaces 23a and 23b) of about 0.84 mm.

In accordance with the invention, a corrector lens means 30 is positioned upon the opposite side of the objective lens of the optical disk player from the optical disk then being read. Corrector lens means 30 contains a plurality of lens elements, with a variable distance air gap being provided between facing surfaces of a sequential pair of elements; illustratively, the corrector means 30 has only two elements, with a first lens element 31 having a first surface 31a facing the objective means 11 and a second surface 31b separated from a first surface 32a of a second lens element 32. The air gap 34 between the first lens rear surface 31b and the second lens front surface 32a adjustable to correct for the range of substrate thickness D. One of the corrector lenses is fixedly mounted and the other lens is mounted in a manner to allow adjustment by motion in the direction of arrows M, toward and away from the rigidly mounted lens; the lenses or corrector 30 are separate and independent of objective means 11, which separately moves to carry out its function of maintaining focus on the disk. It should be understood that some means 35 may be provided to position the correction lens assembly 30 at a variable distance, or a selected one, of a wide range of possible distances from the objective lens means 11 or, with another mechanism 35' position the correction lens means 30 at a variable distance or a selected distance, over a range of distances from the mechanism (not shown) supporting disk 14; means 35 or 35' can thereafter maintain the correction lens means 30 at that selected distance; the distance between means 11 and means 30 may therefore vary over some range with little practical consequence.

A housing means 36' fixedly mounts the front correction lens element 31 at a selected nominal distance (say, 1.00 mm.) from some axial point 24, while the second correction lens means element 32 is mounted in a separate housing means 36 which may be caused to move in direction of arrows M towards or away from first corrector lens means element 31, by the action of suitable mechanical means 37 (which may, for purposes of illustration, include a rack element 38 and a rotatable pinion element 39) caused to move under control of a thickness data-to-spacing distance conversion/drive means 40, responsive to thickness data provided from a data reader means 42 which may obtain the inter-lens correction spacing L data directly from data means 44 upon the optical disk surface 18s. Variations in the position of corrective lens means 30 relative to the objective lens means 11, even when the latter moves relative to the disk, does not cause significant error in corrector lens performance. Alternatively, the disk cover glass thickness D may be, after testing of the individual disk at manufacture, impressed in data means 44. In any case, whether each disk 14 is measured at manufacture and either the layer 18 thickness D or the correction gap dimension L is recorded on the disk surface 18s (where the information will be out-of-focus during disk recording operations and so have minimal effect upon recorder operation) or if each disk is dynamically measured once loaded into the recorder, means 42 obtains data which is either passed through, or converted by, means 40 to set inter-lens distance L.

As an example, for use with an optical disk having a substrate nominal thickness of 1.213 mm. ±0.040 mm., and utilizing a 488 mm. interrogation beam 12 focussed by an objective lens having the above-given characteristics, the corrector means 30 may have lenses 31 and 32 with the following surface radii (with negative radii having a center of curvature lying to the left of the surface, in the figure, and a positive radius having a center of curvature lying to the right of that surface, and with the thickness of the Schott BK7 glass being measured along axis 11a): surface 31a is convex (as, in all cases herein, viewed from the disk), with a very large radius of curvature of about −252.46 mm.; surface 31b is concave, with a curvature radius of about 11.01 mm. and an on-axis spacing (lens 31 axial thickness) of about 2.00 mm.; surface 32a is of complementary direction of curvature to surface 31b and is thus concave, with a radius of curvature of about 10.86 mm. and a nominal on-axis 11a spacing L of about 1.49 mm. from surface 31b; surface 32b is convex, with a large curvature radius of about −106.79 mm. and an on-axis spacing (lens 32 axial thickness) of about 2.00 mm from surface 32a. Variations of several millimeters in spacing of surface 31a to point 24 will cause substantially no change in lens performance. Thus, the objective and corrective lens can be completely mechanically decoupled and the focussing and correcting functions are non-dependent and relatively simple to control.

The nominal 1.488 mm. separation distance L, for correction of spherical aberration from a covering glass substrate 18 of the nominal 1.213 mm. thickness D, gives an on-axis beam Strehl ratio (i.e. the ratio of the focussed spot intensity, to the left of the corrector 30, with respect to the intensity of a perfect spot at the same location) of 0.992, with an rms error of 0.015 wavelength. When the overcoating layer 18 is increased to a maximum thickness of about 1.253 mm., the beam falls to a Strehl of 0.634 and rms error of 0.107 wavelength, even if the objective spacing S is changed to refocus the spot (this degraded performance is due to the increased spherical aberration). The correction lens means 30 is now adjusted to provide a lens 31-lens 32 spacing 1 of about 0.520 mm. and the performance returns to a Strehl of 0.992 and rms error of 0.014 wavelength. If the opposite change in cover layer 18 thickness occurs, to a minimum value of 1.173 mm., the refocussed beam has a Strehl ratio of 0.0907 and an rms error of 0.050 wavelength. The corrector spacing L is changed to 2.481 mm. and the refocussed beam now has a Strehl ratio of 0.991 and an rms error of 0.015 wavelength.

While one presently preferred embodiment of my novel correction lens means for adjustably correcting spherical aberration, due to the variation of thickness in the overcoating substrate of an optical disk, for use in an optical disk player/recorder, has been described in some detail herein, those skilled in the art will now understand that many variations and modifications are obtainable without departing from the basic principles of the present invention. It is my intent, therefore, to be limited only by the scope of the appending claims and not by the specific details and instrumentalities presented by way of description herein.

What I claim is:

1. Apparatus for correcting spherical aberration of light reflected from a surface of an information-bearing layer of an optical disk and traversing through a substantially transparent substrate layer of a nominal thickness, overcoating the information layer, prior to traversal of an objective lens means, comprising:

correction means having a plurality of lens elements, with a variable air gap between the adjacent surfaces of a sequential pair of the lens elements; and means for adjusting the thickness of the air gap responsive to information of the nominal thickness, to correct the additional spherical aberration caused by the change in covering substrate thickness and change the definition of the corrected spot to approach the definition of a spot obtained with a covering substrate of exactly the nominal value.

2. The apparatus of claim 1, wherein said adjusting means includes means for obtaining information about the actual thickness of that optical disk from which optical energy is then being reflected.

3. The apparatus of claim 2, where said obtaining means operates in conjunction with an information-bearing portion of a surface of said disk closest to said lens means.

4. The apparatus of claim 1, wherein said correction means comprises a pair of lenses, with the first lens being nearer to the objective lens and having a convex exiting surface, and the second lens being further from the disk and having a concave surface adjacent to the first lens; said air gap being located between the first and second lenses.

5. The apparatus of claim 4, wherein said adjusting means operates to respectively increase and decreased the length L of said air gap for a disk having respective decreased and increased overcoating substrate thickness.

6. The apparatus of claim 5, further including means for positioning said correction means at a selected one of a range of distances from said objective lens means and for maintaining thereafter a substantially fixed distance between said correction means and said objective lens means.

7. The apparatus of claim 5, further including means for positioning said correction means at a selected one of a range of distances from said disk and for maintaining thereafter a substantially fixed distance between said correction means and said disk.

8. The apparatus of claim 4, wherein a first surface of said first lens has a center of curvature beyond said lens, with respect to said disk, and a radius of curvature on the order of about 100 mm., and a second surface of said first lens has a center of curvature toward said disk and a radius of curvature on the order of about 10 mm.

9. The apparatus of claim 8, wherein said first lens is radially symmetrical about a lens system common axis and has an on-axis thickness on the order of 2 mm.

10. The apparatus of claim 4, wherein a second surface of said second lens has a center of curvature beyond said lens, with respect to said disk, and a radius of curvature on the order of about 250 mm., and a first surface of said second lens has a center of curvature toward said disk and a radius of curvature on the order of about 10 mm.

11. The apparatus of claim 10, wherein said second lens is radially symmetrical about a lens system common axis and has an on-axis thickness on the order of 2 mm.

* * * * *